United States Patent [19]

Howell

[11] 4,216,516

[45] Aug. 5, 1980

[54] PORTABLE GROUND FAULT PROTECTOR

[75] Inventor: Edward K. Howell, Simsbury, Conn.

[73] Assignee: General Electric Company, New York, N.Y.

[21] Appl. No.: 955,036

[22] Filed: Oct. 26, 1978

[51] Int. Cl.² ............................................. H02H 3/26
[52] U.S. Cl. ........................................ 361/45; 361/44
[58] Field of Search ............................ 361/42, 44–50

[56] References Cited

U.S. PATENT DOCUMENTS

| 3,641,393 | 2/1972 | Florance et al. | 361/45 |
| 3,668,471 | 6/1972 | Ambler et a. | 361/45 |
| 3,872,354 | 3/1975 | Nestor et al. | 361/45 |
| 3,953,766 | 4/1976 | Howell et al. | 361/45 |
| 4,023,073 | 5/1977 | Georgi | 361/45 |
| 4,047,079 | 9/1977 | MacPhee | 361/45 |

FOREIGN PATENT DOCUMENTS 980415  1/1965  United Kingdom ...................... 361/44

*Primary Examiner*—Harry E. Moose, Jr.
*Attorney, Agent, or Firm*—Robert A. Cahill; Walter C. Bernkopf; Philip L. Schlamp

[57] ABSTRACT

In the absence of a ground fault, a triac completes an AC energization circuit for a relay whose contacts then close to provide load circuit continuity. Gate drive for the first triac is obtained from a secondary winding of a transformer whose primary is driven by an oscillator for the purpose of producing a differential transformer unbalancing current signal in the event of a desensitizing ground fault on the load circuit neutral conductor. When the differential transformer senses a ground fault, the oscillator is disabled, and the resulting loss of gate drive renders the triac non-conductive to drop out the relay.

4 Claims, 1 Drawing Figure

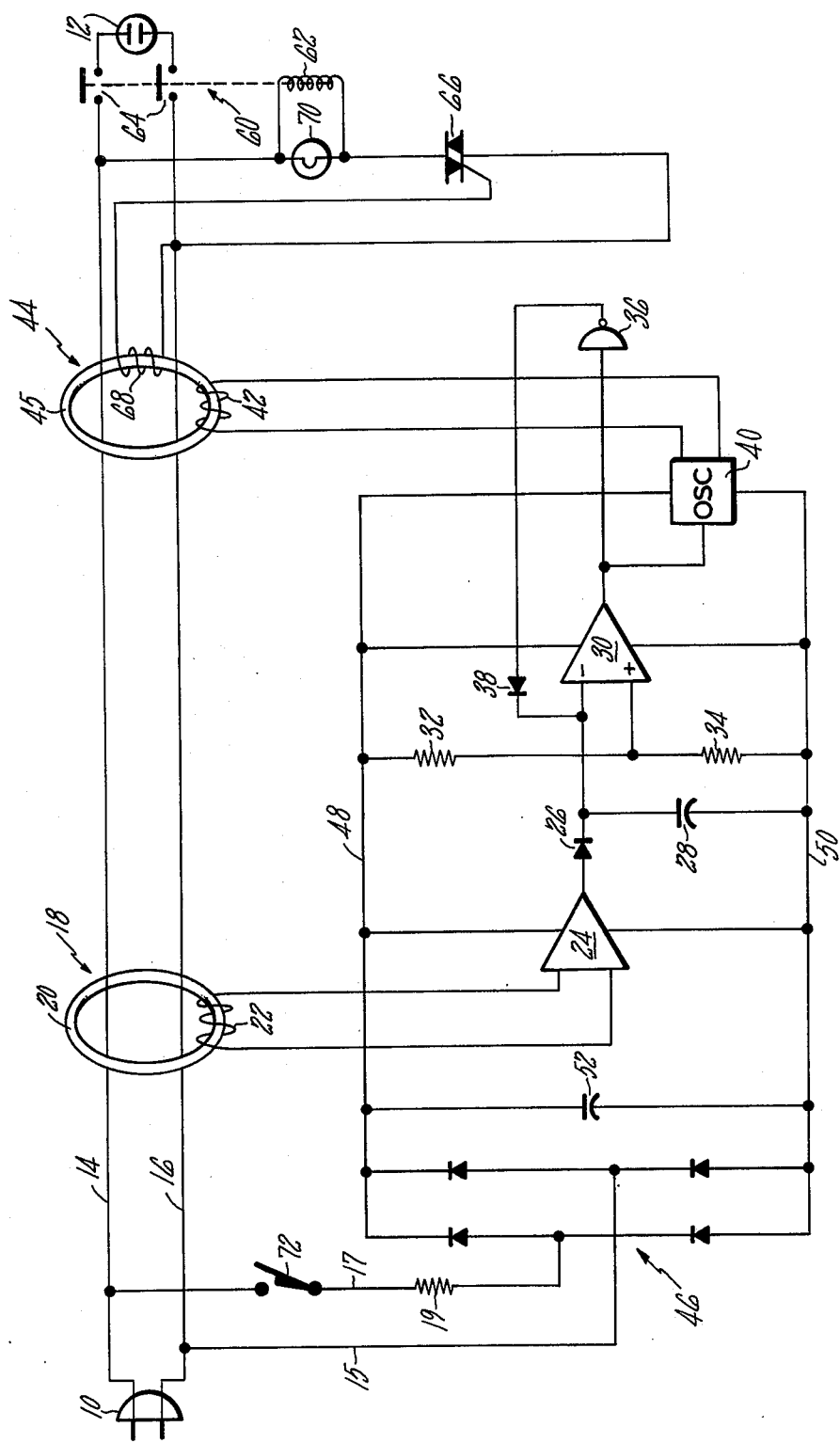

PORTABLE GROUND FAULT PROTECTOR

BACKGROUND OF THE INVENTION

Commonly assigned U.S. Pat. No. 4,079,344, discloses a portable ground fault circuit interrupter (GFCI) device which can be plugged into any conventional wall outlet receptacle to provide personnel ground fault protection for a load circuit plugged into it. With this configuration, the GFCI device can simply be unplugged from one receptacle and plugged into another receptacle at a location convenient to the load circuit for which ground fault protection is desired. Basically, the portable GFCI device disclosed in this patent comprises a set of electrical connector blades or prongs which plug into a conventional receptacle, a relay, and a GFCI receptacle device, such as disclosed in commonly assigned U.S. Pat. No. 4,010,432. This GFCI receptacle device is designed to be installed in essentially dedicated fashion in a receptacle box in place of a conventional outlet receptacle. Thusly installed, ground fault protection is afforded any load circuit plugged into its receptacle sockets. In the event of a ground fault, the resulting current imbalance produces a ground fault signal in the secondary of a differential transformer. This ground fault signal is processed pursuant to developing a triggering signal on the gate of a silicon controlled rectifier connected in an energization circuit for a trip solenoid. Upon energization of this solenoid, its plunger defeats a mechanical latch holding circuit interrupting contacts closed, and the contacts consequently spring open to interrupt the load circuit.

In the portable GFCI device configuration disclosed in U.S. Pat No. 4,079,344, the GFCI receptacle is wired to the connector blades through normally open contacts of the relay. The inclusion of this relay serves as a safety measure to insure that the receptacle into which the portable GFCI device is plugged does not have a discontinuity in the neutral side of the power circuit feeding it. It will be appreciated that the existence of such a discontinuity would deny power to the GFCI receptacle ground fault signal processing circuitry, as well as the trip solenoid, and yet, but for the relay, the hot line side of the wall receptacle would be connected through to the GFCI receptacle sockets and thence to any load circuit plugged thereinto. In this situation, the potential for an electrical shock exists for a person coming into contact with the hot line side of the load circuit and ground, but the GFCI receptacle would be incapable of effecting a circuit interruption. Since the relay cannot be energized to close its contacts and complete the circuit between the wall receptacle and the GFCI receptacle unless there is complete continuity of the power circuit feeding the wall receptacle, this potentially hazardous situation is avoided.

It is a principal object of the present invention to provide an improved portable GFCI device.

A further object is to provide a portable GFCI device which is compact in size, inexpensive to manufacture, and convenient to use.

Other objects of the invention will in part be obvious and in part appear hereinafter.

SUMMARY OF THE INVENTION

In accordance with the present invention, there is provided a portable GFCI device wherein the ground fault signal processing circuitry is utilized to maintain an electronic switch controlling the energization of a relay conductive in the absence of a ground fault condition. While the relay is so energized, its normally open contacts are closed to supply power to a load circuit. In the event of a ground fault, the electronic switch is rendered non-conductive, and the relay is dropped out to interrupt the load circuit. This approach is directly opposite to the conventional GFCI device approach, wherein a normally non-conductive electronic switch is triggered into conduction to complete an energization circuit for a load circuit interruption initiating trip solenoid when a ground fault condition is sensed.

More specifically, the portable GFCI device of the present invention includes a differential current transformer for sensing ground fault occasioned imbalances in the currents flowing in the line and neutral conductors of a load circuit. Also included in conventional fashion is a second transformer whose primary is driven by an oscillator for the purpose of inducing a differential transformer current imbalancing signal on the neutral conductor in the event of a desensitizing ground fault on the neutral side of the load circuit. In accordance with the present invention, this second transformer includes an additional secondary winding in which the oscillator induces a signal for application to maintain an AC electronic switch, such as a triac, conductive. This electronic switch is connected in series with the operating coil of a relay across the line and neutral sides of the power circuit. Thus, as long as the oscillator is operative, the electronic switch remains conductive to sustain energization of the relay, and the normally open relay contacts, connected in the line and neutral sides of the circuit, remain closed to supply power to the load. If there is a discontinuity in the neutral side of the power circuit feeding the load circuit, the relay cannot pick up, leaving its contacts open. Consequently, the possibility of having the line side of the power circuit live without the ground fault signal processing circuit being powered up is avoided.

In the event of a ground fault, the ground fault signal processing circuitry operates to disable the oscillator, whereupon the electronic switch is allowed to go into non-conduction, and the relay drops out to interrupt the power circuits.

This invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawing, in which the sole FIGURE of the drawing is a circuit schematic, partially in block diagram form, of a portable ground fault protector constructed in accordance with the invention.

DETAILED DESCRIPTION

Referring now to the drawing, the portable ground fault protector of the present invention includes a plug connector 10 for insertion in a conventional outlet receptacle and a socket 12 into which is inserted the plug connector of a load circuit, such as an electrical appliance. This plug and socket are interconnected by conductors 14 and 16, individually connected with the line and neutral sides of the power circuit feeding the outlet receptacle. A differential current transformer, generally indicated at 18, includes a toroidal core 20 through which conductors 14 and 16 pass as single-turn primary windings. Any imbalance in the currents flowing in conductors 14 and 16, as occasioned by a ground fault on the load circuit plug into socket 12, produces a ground fault signal in a multi-turn secondary winding 22 of the differential current transformer. This ground fault signal is amplified by an amplifier 24. The amplified current signal at the output of this amplifier is half-wave rectified by a diode 26 and integrated by a capacitor 28. The voltage developing across this capacitor is applied to the inverting input of a comparator 30 whose non-inverting input receives a reference voltage developed by a voltage divider consisting of resistors 32 and 34. The output of this comparator is fed back through an inverter 36 and a diode 38 to its inverting input. The comparator output is also applied as a control input to an oscillator 40 connected to drive a primary winding 42 of a second transformer, generally indicated at 44 and having a toroidal core 45 through which conductors 14, 16 pass as single turn secondary windings. The recognized purpose of oscillator 40 and transformer 44 is to produce a current signal on conductor 16 when the neutral side of the load circuit plugged into socket 12 becomes faulted to ground through a fault impedance of sufficiently low magnitude as to desensitize the ground fault protector in detecting the full magnitude of any line to ground fault current. This current signal unbalances the differential current transformer in the same fashion as does a line ground fault, and the resulting ground fault signal appearing in secondary winding 22 is correspondingly processed pursuant to initiating a ground fault protection function.

Operating power for the ground fault protector is tapped from conductors 14, 16 via leads 15, 17 connected through a voltage dropping resistor 19 to the inputs of a full-wave rectifying diode bridge, generally indicated at 46. One bridge output is connected to a positive supply bus 48 and the other bridge output is connected to a negative supply bus 50. A filtering capacitor 52 is connected across these supply buses, as are amplifier 24, the voltage divider (resistors 32 and 34), comparator 30 and oscillator 40.

The schematic diagram thus far described is essentially a simplified functional block diagram of the GFCI module disclosed in commonly assigned U.S. Pat. No. 3,953,766. In the absence of a ground fault signal, integrating capacitor 28, is essentially discharged, and thus the voltage applied to the inverting input of comparator 30 is low in relation to the reference voltage applied to its non-inverting input. Consequently, the voltage at the output of this comparator is relatively high to controllably enable the operation of oscillator 40. In the GFCI module of U.S. Pat. No. 3,953,766, this high comparator output is inverted to a low output and utilized to disable the gate triggering circuit of a thyristor, e.g. silicon controlled rectifier, connected in the trip solenoid energization circuit. Thus, this thyristor is held in a non-conductive state to inhibit trip solenoid energization.

In the presence of a ground fault condition, the resulting ground fault signal is amplified in amplifier 24, whose current output is integrated by capacitor 28. When the voltage on this capacitor exceeds the reference voltage at the junction of resistors 32 and 34, comparator 30 abruptly switches, in that its output goes from a relatively high voltage level to a low level. Inverter 36 in the feedback path inverts the low comparator output to a high level effective in clamping the comparator inverting input to a voltage level in excess of the reference voltage level. Thus, comparator switching is regenerative and no longer responsive to the current output of amplifier 24. The low comparator output voltage also serves to disable oscillator 40 and the driving of transformer primary winding 42 terminates. In the GFCI module of U.S. Pat. No. 3,953,766, the low comparator output is inverted to thus enable the gate triggering circuit of the thyristor, which then switches to its highly conductive state. The trip solenoid is thus energized to mechanically trip circuit interrupting contacts which thereupon open to clear the ground fault on the load circuit.

In the portable ground fault protector of the present invention, the trip solenoid, its energization controlling thyristor, and the trippable circuit interrupting contacts are eliminated. Instead, the present invention utilizes a relay, generally indicated at 60 and having an operating coil 62 for controlling the position of a set of normally open contacts 64 individually connected in series with conductors 14 and 16 just upstream from socket 12. The relay operation coil is connected in series with an AC electronic switch, such as a triac 66, across conductors 14 and 16 just upstream from contacts 64. A multi-turn secondary winding 68, wound on core 45 of transformer 44, has one side connected to the gate of triac 66 and its other side connected to conductor 16.

From the foregoing description, it is seen that as long as oscillator 40 is operative to drive primary winding 42 of transformer 44, a gate drive voltage for triac 66 is induced in secondary winding 68. Consequently, the triac is triggered to its highly conductive state to complete the energization circuit for relay operating coil 62. Relay 60 is thus picked up, and its contacts close to supply power to socket 12 and any load circuit plugged thereinto. To insure reliable turn-on of the triac in the presence of an inductive load such as relay coil 62, any suitable impedance, which may take the form of a pilot light 70, is connected across the coil. It will be recalled that when comparator 30 switches during the processing of a ground fault signal induced in secondary winding 22 of the differential transformer, oscillator 40 is incidentally cut off. Gate drive for triac 66 disappears, and energization of relay operating coil is terminated. The relay drops out, opening its contacts 64 to remove power from socket 12. Since comparator 30 switches regeneratively, energization of the relay coil 62 cannot be re-established even if the ground fault signal in secondary winding 22 disappears. Thus to reset the ground fault protector of the present invention, a switch 72 is opened to remove the supply voltage from between buses 48 and 50. When this supply voltage is re-established, the voltage at the inverting input of comparator 30 will have assumed a low level relative to the reference voltage, and the comparator output voltage goes high to restart oscillator 40.

If the neutral side of the power circuit feeding the outlet receptacle into which plug 10 is inserted looses continuity, it is seen that there is no voltage across conductors 14 and 16 to energize relay 60, and its contacts 64 remain open, leaving socket 12 completely dead.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A ground fault protector comprising, in combination:
   A. first and second conductors for respective electrical connection between the line and neutral sides of a power circuit and a load circuit;
   B. a relay having
      (1) an operating coil, and
      (2) a pair of normally open contacts individually connected in series with said first and second conductors;
   C. a triac connected in series with said relay operating coil across said first and second conductors, said triac including a gate;
   D. a differential current transformer coupled with said first and second conductors and having a secondary winding in which is developed a ground fault signal proportional to an imbalance in the currents flowing in said first and second conductors;
   E. an additional transformer coupled with said first and second conductors, said transformer including a primary winding and a secondary winding connected in circuit with said gate of said triac;
   F. an oscillator connected to drive said primary winding, whereby to develop a differential transformer imbalancing current signal in the one of said first and second conductors connected with the neutral side of the power circuit in the event of a low impedance ground fault thereon and to develop a gate voltage on said secondary winding of said additional transformer for rendering said triac conductive, whereupon said relay operating coil is energized to close said contacts and apply power to the load circuit; and
   G. a signal processor connected to said differential current transformer secondary winding and selectively operating in response to said ground fault signal pursuant to disabling said oscillator, whereupon said triac goes into non-conduction and said relay contacts open to remove power from the load circuit.

2. The ground fault protector defined in claim 1, wherein said signal processor includes
   (1) an amplifier for amplifying said ground fault signal;
   (2) a capacitor connected to the output of said amplifier for developing a signal voltage proportional to the integral of said ground fault signal;
   (3) a comparator for comparing said signal voltage with a reference voltage, said comparator operating to disable said oscillator when said signal voltage exceeds said reference voltage.

3. The ground fault protector defined in claim 2, wherein said comparator is switched from a first condition to a second condition when said signal voltage exceeds said reference voltage, said second condition operating to sustain disablement of said oscillator.

4. The ground fault protector defined in claim 3, wherein said signal processor is connected in circuit between said first and second conductors pursuant to receiving operating power therefrom, said protector further including a reset switch operable to temporarily remove operating power from said signal processor, such that, upon subsequent restoration of operating power, said comparator is switched back to its first condition.

* * * * *